United States Patent
Morse (10) Patent No.: US 6,854,085 B1
(45) Date of Patent: Feb. 8, 2005

(54) SYSTEM AND METHOD FOR AUTOMATICALLY PRE-SETTING FORM FIELD VALUES

(75) Inventor: Stephen P. Morse, San Francisco, CA (US)

(73) Assignee: Netscape Communicatons Corporation, San Francisco, CA (US)

( * ) Notice: Subject to any disclaimer, the term of this patent is extended or adjusted under 35 U.S.C. 154(b) by 0 days.

(21) Appl. No.: 09/354,018

(22) Filed: Jul. 15, 1999

(51) Int. Cl.[7] .............................................. G06F 15/00
(52) U.S. Cl. ..................................... 715/507; 715/508
(58) Field of Search ................................ 715/507, 508, 715/501.1; 707/507, 501.1; 705/72, 75, 76, 26, 27; 709/201, 217, 218

(56) References Cited

U.S. PATENT DOCUMENTS

| | | | |
|---|---|---|---|
| 5,727,156 A | 3/1998 | Herr-Hoyman et al. | 709/219 |
| 5,790,793 A | 8/1998 | Higley | 709/218 |
| 5,794,259 A | 8/1998 | Kikinis | 707/507 |
| 5,799,285 A | 8/1998 | Klingman | 705/26 |
| 5,870,559 A | 2/1999 | Leshem et al. | 709/224 |
| 5,870,767 A | 2/1999 | Kraft, IV | 707/501.1 |
| 5,893,127 A | 4/1999 | Tyan et al. | 707/513 |
| 5,905,248 A | 5/1999 | Russell et al. | 235/462.15 |
| 5,913,215 A | 6/1999 | Rubinstein et al. | 707/10 |
| 6,131,086 A * | 10/2000 | Walker et al. | 705/26 |
| 6,192,380 B1 * | 2/2001 | Light et al. | 715/505 |
| 6,199,079 B1 * | 3/2001 | Gupta et al. | 715/507 |
| 6,208,339 B1 * | 3/2001 | Atlas et al. | 345/780 |
| 6,327,574 B1 * | 12/2001 | Kramer et al. | 705/14 |
| 6,338,074 B1 * | 1/2002 | Poindexter et al. | 715/500 |
| 6,421,693 B1 * | 7/2002 | Nishiyama et al. | 715/507 |
| 6,499,042 B1 * | 12/2002 | Markus | 715/507 |
| 6,643,624 B2 * | 11/2003 | Philippe et al. | 705/26 |
| 6,651,217 B1 * | 11/2003 | Kennedy et al. | 715/507 |
| 6,701,486 B1 * | 3/2004 | Weber et al. | 715/507 |
| 2002/0023108 A1 * | 2/2002 | Daswani et al. | 707/507 |

OTHER PUBLICATIONS

Maret et al., Mulitmedia Information Interchange : Web Forms Meet Data Servers, IEEE Jul. 1999, pp. 499–505.*
Davulcu et al., A Layered Architecture for Querying Dynamic Web Content, ACM Jun. 1999, pp. 491–502.*

* cited by examiner

Primary Examiner—Stephen S. Hong
Assistant Examiner—Cong-Iac Huynh
(74) Attorney, Agent, or Firm—Arent Fox PLLC (57) ABSTRACT

A system and method for filling in a field of a form includes a network access facility and a mapping facility. Specifically, the network access facility accesses a network in order to receive the form, and the mapping facility maps the field of the form to a predetermined value. For example, the network may be the Internet or the World Wide Web.

8 Claims, 5 Drawing Sheets

FIG.1A

```
<form>
    area code: <input name = "ac"><br>
    postal code: <input name = "pc"><br>
</form>
```

SYSTEM AND METHOD FOR AUTOMATICALLY PRE-SETTING FORM FIELD VALUES

BACKGROUND OF THE INVENTION

1. Field of the Invention

The present invention relates to forms such as HTML based forms served and processed by Internet and World Wide Web (WWW) sites.

2. Description of the Related Art

The Internet is widely used as a means for conducting business, personal and commercial. In fact, Internet commerce has become increasingly popular as WWW sites are continually developed for every imaginable purpose. A standard technique for conducting business or otherwise communicating information over the Internet and WWW is the use of WWW site registration forms which may be filled in with necessary fielded information. The completion and submission of such a form is often required before goods and services may be accessed, sold, distributed, etc. Such forms serve as the mechanisms to automatically exchange information among trading partners, network users, etc. Most forms require standard information, such as name, address, etc. related to a network user or transaction. As such, an Internet user often must re-type the same information at different WWW sites. And, with increased Internet use, a significant amount of time is wasted typing field values over and over again while accessing WWW sites. This redundancy of data entry present problems that reduce network efficiency.

Very few techniques have been proposed to squarely address the aforementioned data redundancy problems associated with having to re-type or re-enter WWW site form field values. One such technique is to save the values from a specific WWW site so that if that exact form is revisited, then the information may be repeated. This technique is only useful if a specific WWW site is used repeatedly and not useful for the wide use of different sites across the WWW.

Thus, there exists a need to provide new and improved systems and methods to facilitate form field entry that may be incorporated into modern WWW sites, web browsers, etc. Such systems and methods must permit easy and efficient form field entry. To be viable, such systems and methods must be implemented without causing significant burdens to network infrastructures or undue increases in infrastructure costs.

SUMMARY OF THE INVENTION

In view of the foregoing comments regarding the related art, the principal object of the present invention is to solve the aforementioned problems.

It is another object of the present invention to provide a system and method for pre-setting Internet forms that will alleviate the need to repeatedly type standard user information.

These and other objects of the present invention are achieved by providing a system for automatically pre-setting form values. This system includes a network access facility and a mapping facility. The network facility is configured to access a network site, such as a WWW site, and receive a form including at least one field. The mapping facility is configured to map each field to a pre-determined value.

According to another aspect of the present invention, provided is a network client configured to facilitate automatic pre-setting of form fields. The network client includes a network access facility, such as a browser, configured to access a network site to receive a form including at least one field, and a mapping facility configured to map each field to a pre-determined value.

According to another aspect of the present invention, provided is a method for facilitating automatic pre-setting of form field values. The method includes the steps of accessing a network site to receive a form with fields to be filled in, and mapping the field to be filled in to a pre-determined value.

And, according to a another aspect of the present invention, provided is a system for automatically pre-setting form field values, that includes a form facility that is configured to process a form with fields to be filled in or selected, and a mapping facility that is configured to map each field to a pre-determined value.

BRIEF DESCRIPTION OF THE DRAWING FIGURES

The present invention is described in detail below with regard to the attached drawing figures, of which:

FIG. 1A is a view of a Hyper-Text Markup-Language (HTML) form with fields to be filled in;

DETAILED DESCRIPTION OF THE PREFERRED EMBODIMENTS

The present invention is now discussed with reference to the drawing figures that were briefly described above. Unless otherwise specified, like parts and processes are referred to with like reference numerals.

In the discussions that follow, the term:

"field name" is used as an identifying name referring to a form field to be filled in or selected;

"schema" is used as an identifying name defining what a field name actually represents;

"mapping" is used to identify a relationship from one value to another value;

"pre-fill" defines when a form text field is filled in with a value;

"pre-select" defines when a form list item is selected;

"pre-setting" refers to the pre-filling or pre-selecting of a form field;

"field-to-schema mapping" is used to identify a relationship between a form field name and a schema name;

"schema-to-value mapping" is used to identify a relationship between a schema name and a value;

"URL-specific field-to-schema mapping" is used to identify a relationship between the field name of a field on a specific WWW site form and a schema name;

"generic field-to-schema mapping" is used to identify a relationship between a field name commonly used across many WWW sites and a schema name; and "dynamic schema" is a schema name equal to the form field name and is used to identify a form field name that has no URL specific or generic field-to-schema mapping.

Figure 1A:
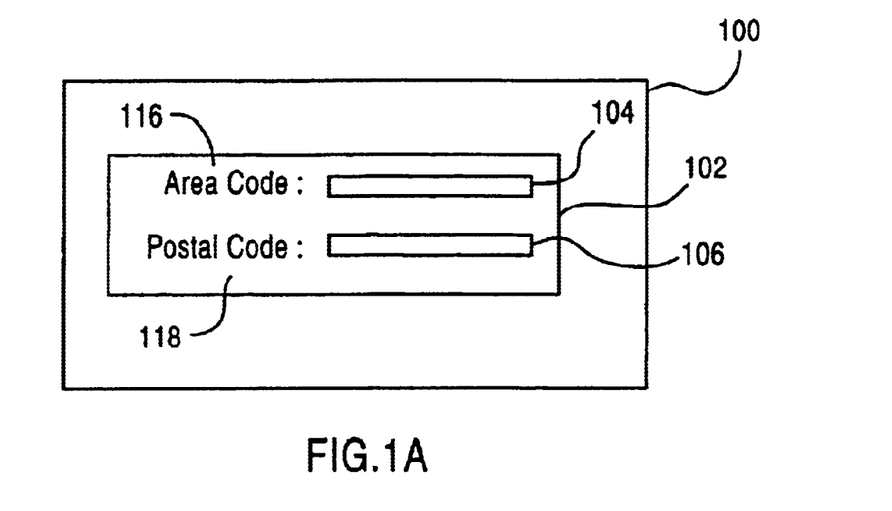
Figure 1B:
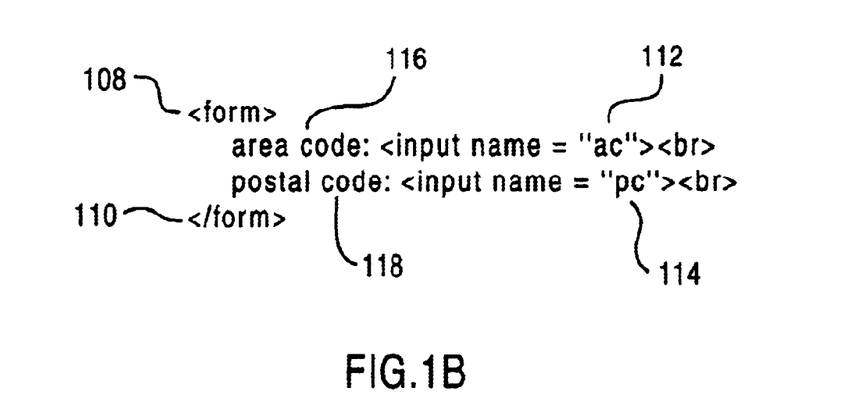
FIG. 1B is the HTML source code for the form depicted in FIG. 1A.

To illustrate salient features of the present invention, reference now is made to an HTML form with fields to be filled in, which is depicted in FIG. 1A. In particular, HTML Form 100 has a form section 102 that contains fields to be filled in, 104 and 106. Such a form is generated by the HTML source code described with regard to FIG. 1B. Form tags 108 and 110 delimit the form to be filled in, and the input tags 112 and 114 correspond to the fields in which a user may enter values. Such input tags may be mapped to a schema forming the field-to-schema mapping. Once a user inputs data into fields, the values may be mapped to a schema to form a schema-to-value mapping. Labels 116 and 118 correspond to the field labels displayed on the form. Such labels may also be mapped to schemas forming field-to-schema mappings.

Figure 1C:
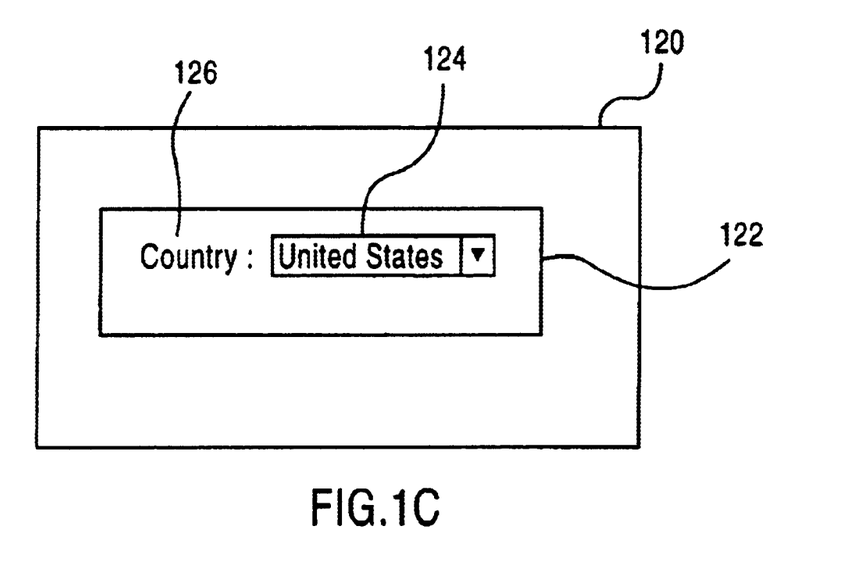
FIG. 1C is a view of an HTML form with a field to be selected.

Similarly, FIG. 1C depicts an HTML form with fields that are configured for multiple option selection (e.g. a pulldown box). In particular, HTML form 120 has a form section 122 that contains a field 124 to be selected and a field label 126. This form is generated by the HTML source code described with regard to FIG. 1D. Form tags 123 and 125 delimit the form to be filled in, and the select tags 138 and 141 delimit the list from which values may be selected. Options 130, 132, 134, and 136 represent the entries in the list to be selected. The values of each option are delimited by option tags 140 and 142. Once a value is selected, the value may be mapped to a schema to form a schema-to-value mapping. For example, the field name 128 corresponds to the field to be selected and may be mapped to a schema to form the field-to-schema mapping. The field label 144 corresponds to the field label displayed on the form and may also be mapped to a schema to form another field-to-schema mapping.

The descriptions presented above address forms to be filled in and their corresponding parts. Such forms are generally filled in by a user. Data redundancy problems associated with having to re-type or re-enter form field values are squarely addressed by the present invention. In particular, a system for automatically pre-setting form field values is depicted in block diagram FIG. 1E.

Figure 1D:
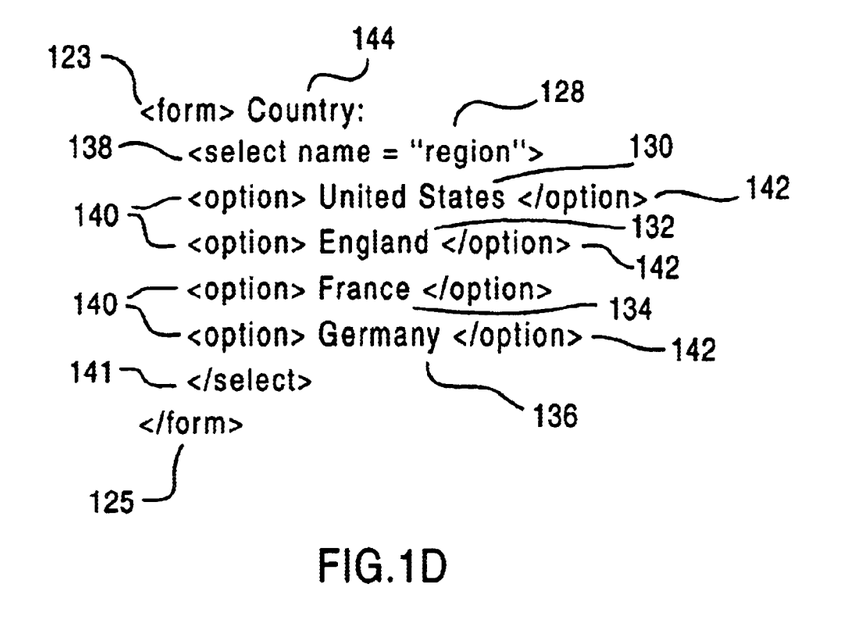
FIG. 1D is the HTML source code for the form depicted in FIG. 1C.
Figure 1E:
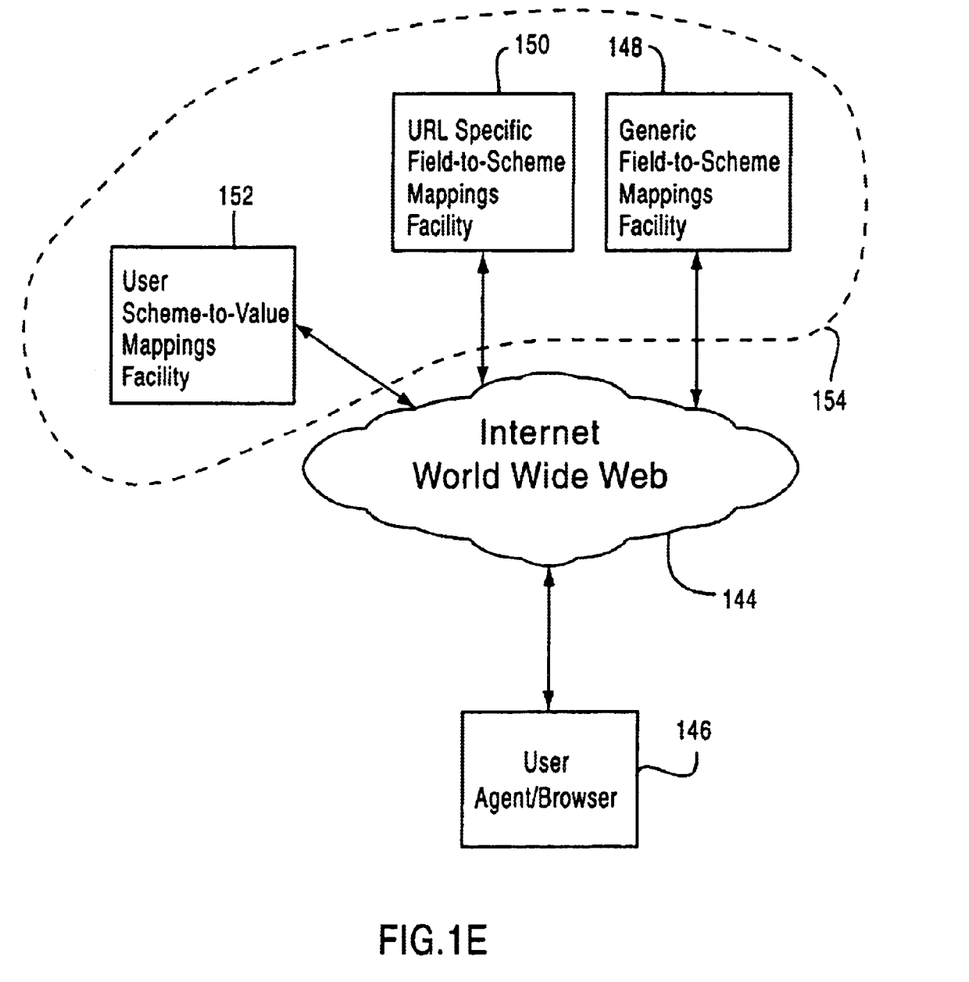
FIG. 1E is a block diagram that depicts the design of a system for pre-setting form field values according to a preferred embodiment of the present invention.

Referring now to FIG. 1E, a user agent or browser 146 is configured to access a network such as the Internet and World Wide Web 144 so that it may send and receive forms to be filled in. In particular, FIG. 1E also includes an object 154 encircled by a phantom line that is intended to identify a logical arrangement of facilities that carry out certain functions as described herein. Such facilities may be implemented using network resources such as servers or other automatic data processing system(s). Such facilities may be implemented using a server system configured with appropriate hardware and/or software sub-systems.

The user agent 146 receives a forms and performs a semantic interpretation of the form and identifies the fields to be filled in. This may be done by associating a field name with each form field to be filled in. For example, as with the HTML form shown in FIG. 1A and the source code described in FIG. 1B, input tags 112 and 114 could be used as field names.

Once fields are determined, the user agent 146 accesses URL-specific field-to-schema mapping facility 150 to obtain the schemas for each field to be filled in. For example, using the HTML shown in FIG. 1B and using the input tags 112 and 114 as the field names, the following could be the URL-specific field-to-schema mapping:

ac -> phone.area pc -> address.zip

If no URL-specific field-to-schema mapping exists for a field, the user agent 146 accesses the generic field-to-schema mapping facility 148 to obtain the schema name for the field. For example, a large number of WWW sites may use "area" and "zip" as field names. In this case the generic field-to-schema mapping would be:

area -> phone.area zip -> address.zip

If no schema name exists in generic field-to-schema mapping facility 148 for the field, user agent 146 can be configured to assign the field name as the schema name, which is called a dynamic schema. For example, if an unexpected field name of "shoesize" is encountered, it will be assumed to correspond to a schema name of "shoesize." If this is the first time "shoesize" is encountered, there will be no schema-to-value mapping for it, and the corresponding field will not be pre-set. But, when the user submits the form, the user agent 146 may be configured to update the user's schema-to-value mapping based on the submitted form as follows:

shoesize -> 9½

The next time the user encounters "shoesize", the field may be pre-set.

Next, user agent 146 accesses the user schema-to-value mapping facility 152 to obtain the values for each schema identified. Such shema-to-value mappings are specific to a particular user. Using the above examples, a user's schema-to-value mapping could be:

phone.area -> 415 address.zip -> 94109

Such values can then be used to pre-set a form field. However, certain schema names may have values that result from a concatenation of other values. For example, the following schema names could correspond to field names at certain WWW sites:

name.first name.middle name.last

Furthermore, other WWW sites might not look for a name to be broken down, but instead request a user's full name. The schema name for this WWW site might be:

name.all

Thus, a concatenation rule might exist for the full name as follows:

name.all=name.first+name.middle+name.last.

If a concatenation rule exists, the user agent 146 concatenates the values obtained from the schema-to-value mapping facilities 152 accordingly.

Next, user agent 146 uses the values obtained to pre-select or pre-fill the associated form fields. There is a notable difference between prefilling a value and pre-selecting a list value. When pre-filling a form field, the set of values that can be placed in the field is unconstrained, whereas when pre-selecting the set of values for a list is constrained to be one of those defined by the form. For example, the source code in FIG. 1D has a list constrained to options 130, 132, 134, and 136 ("United States", "England", "France", and "Germany"). If the schema-to-value mapping gave any other value, the list cannot be pre-selected. The chances of being able to pre-select a value are increased if there are additional values associated with each list entry. For example, the option "England" may also have been written in HTML as:
    <option value="UK">England</option>
A schema-to-value mapping referencing "UK" or "England" would facilitate pre-selecting the field. Another way to increase the chances of pre-selecting a list value is to have synonymous values in the schema-to-value mapping. For example, the values "US" or United States" could be synonyms for the value "USA".

Other problems exist with pre-setting form fields. Certain forms may contain fields that ask for the user passwords. Such fields are readily distinguished from non-password fields because they contain the password attribute. Several reasons make it unwise to pre-set passwords. A user may have different passwords for each WWW site. If a wrong value is used, the user won't know it's the wrong value because passwords are usually hidden or encrypted when entered. And, if the form is submitted with an incorrect password, the WWW site will receive the user's secret password for some other WWW site. Accordingly, user agent 146 could be configured to not pre-set fields with the password attribute.

Another problem encountered could be hidden fields. A hostile WWW site may hide pre-fillable fields to obtain user information. Since the field is hidden, the user would not notice or be otherwise aware that the hidden field was being pre-set. One way of preventing any such unwanted disclosures of information is to configure the user agent 146 to require the user to "touch" every form field that is to be pre-set. Another solution is to configure user agent 146 to provide a pop up list of all the values that would be pre-set and request the user's OK before pre-setting the form fields.

Another problem associated with the automatic pre-setting of form fields is that many WWW sites are in different languages. Although the ideas here depend on specific text strings, all strings are contained in mapping facilities 148, 150 and 152 and none are hard coded into user agent 146. The mapping facilities 148, 150 and 152 may be configured to be table driven, with separate mapping tables supporting different languages.

The mapping facilities 148, 150, and 152 are configured to be accessed via the Internet or WWW. It is noted that the mapping facilities 148, 150 and 152 and the user agent 146 could be placed on a server or network configured so that the user agent 146 may obtain access to the mapping facilities 148, 150 and 152. It is further noted that the user agent 146 could be any well known web browser software package such as the Netscape Communicator Suite of client products (e.g., web browser, mail client, etc.) which is manufactured and marketed by NETSCAPE COMMUNICATIONS CORP., and which may be configured as such to receive a form to be filled in. It is also noted that user agent 146 could be a plug-in configured to receive a form to be filled in. It is also noted that FIGS. 1A through 1D describe HTML forms to be filled in, however the present invention could be used to fill in other kinds of forms, including but not limited to Visual Basic and SQL*Windows forms.

Figure 2:
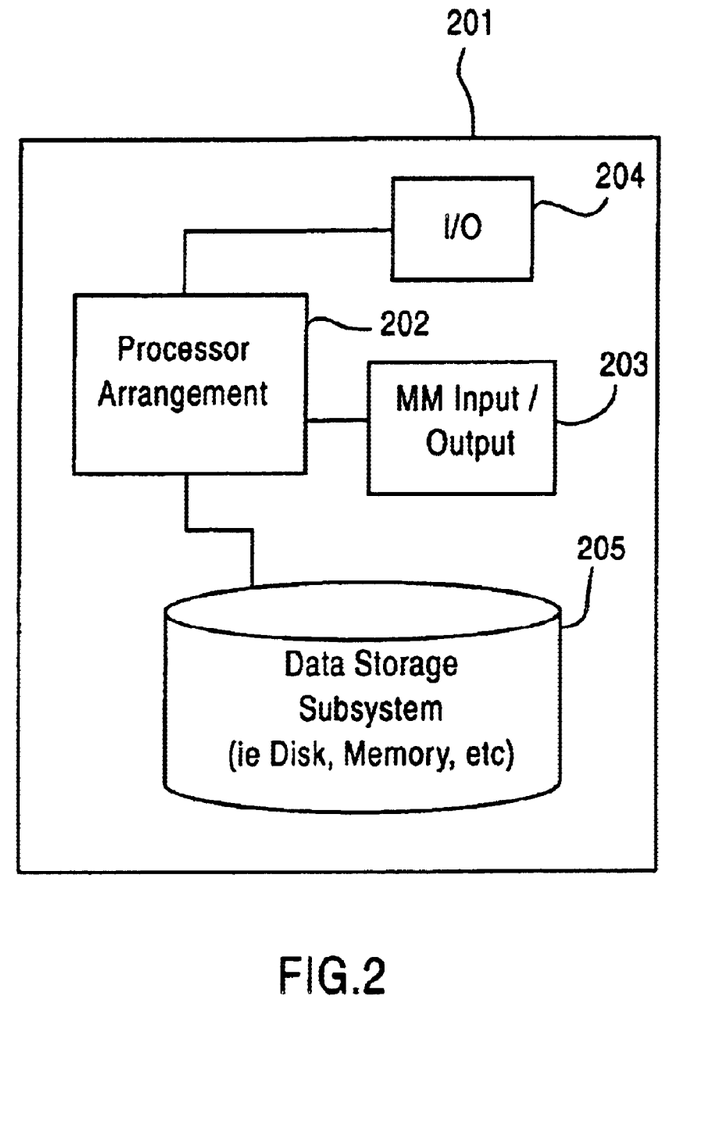
FIG. 2 is a block diagram that illustrates an automatic data processing system which may be configured to facilitate automatic pre-setting of form field values according to a preferred embodiment of the present invention; and, FIG. 3 is a flowchart that illustrates a method for automatically pre-setting form fields according to a preferred embodiment of the present invention.

Referring now to FIG. 2., depicted therein is a block diagram of an automatic data processing system (ADP) which may be configured to facilitate the automatic pre-setting of form field values in accordance with the present invention. In particular, ADP 201, such as a personal computer, includes a processor arrangement 202, a data storage subsystem 205, and an input and output device 204 capable of receiving and sending forms to be filled in, such as those served by a WWW site via the Internet. Additionally, ADP 201 also may include multi-media input and output devices 203, such as speakers, CD ROM inputs, printers, etc. ADP 201 may be configured to run a network client, user agent or other network content manifestation application which supports form entry. As mentioned above, such an application could be the Netscape Communicator Suite of client products.

Figure 3:
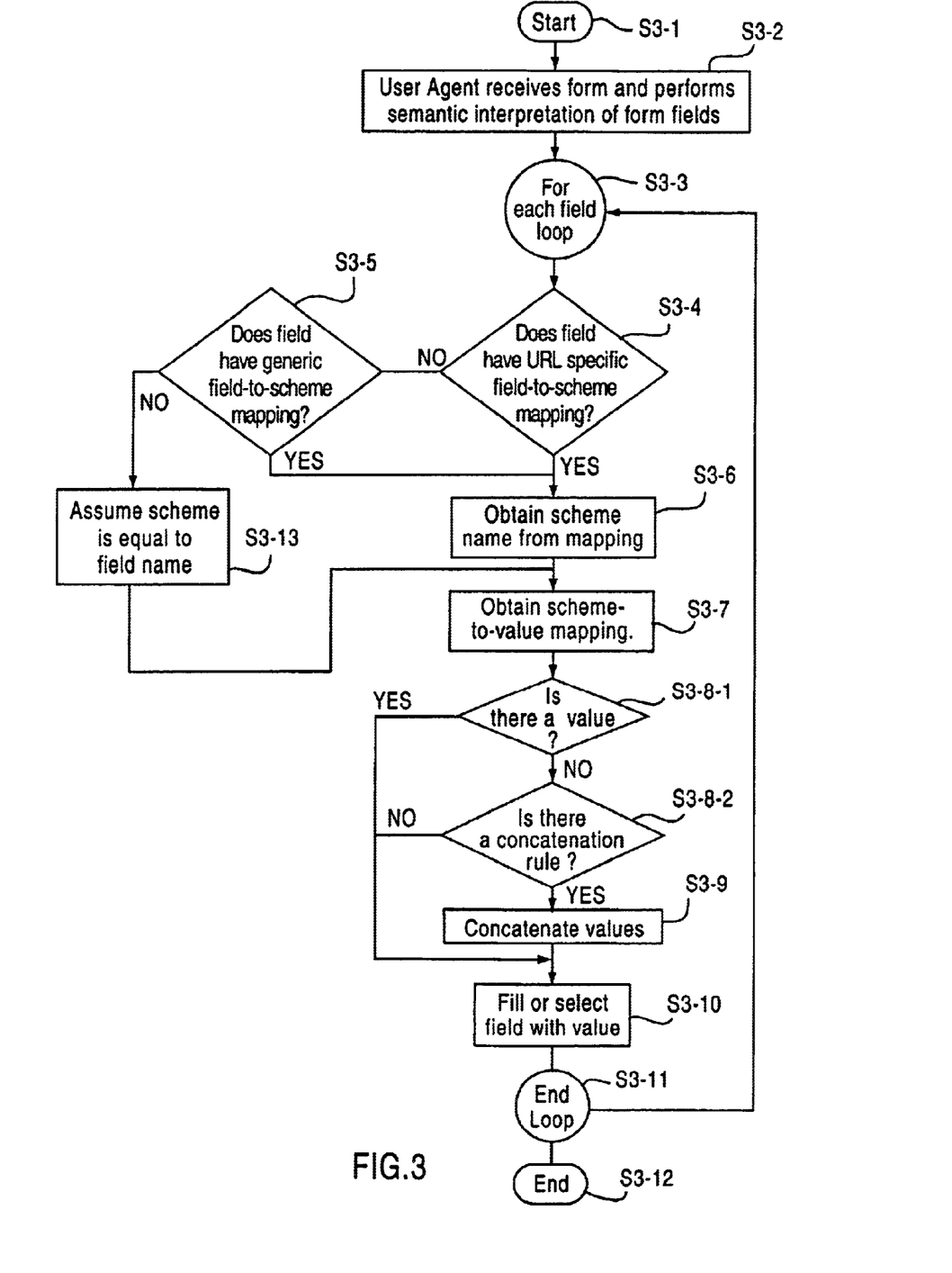

Referring now to FIG. 3, depicted therein is a flowchart that illustrates a method for automatically pre-setting form fields according to a preferred embodiment of the present invention. Processing begins at step S3-1 and immediately proceeds to step S3-2. At step S3-2, the user agent receives a form with at least on field to be filled in and performs a semantic interpretation of form fields. This may be done by associating a field name, with each form field to be filled in. For example, as with the HTML form shown in FIG. 1A and the source code described in FIG. 1B, input tags 112 and 114 could be used as field names.

Next at step S3-3, a loop is performed for each field interpreted in step S3-2. The steps that proceed to the end of the loop S3-11 shall be repeated for each interpreted field. Step S3-3 proceeds immediately to step S34.

At step S3-4, the field name from step S3-2 is compared against a URL Specific field-to-schema mapping. For example, using the HTML from FIG. 1B and using the input tags 112 and 114 as the field names, the following could be the URL-specific field-to-schema mapping:
    ac -> phone.area
    pc -> address.zip
If a URL-specific field-to-schema mapping exists for the current field, the next step is step S3-6, otherwise the next step is step S3-5.

At step S3-5, the field name is compared against a generic field-to-schema mapping. For example, a large number of WWW sites may use "area" and "zip" as field names. In this case the generic field-to-schema mapping would be:
    area -> phone.area
    zip -> address.zip
If there exists a generic field-to-schema mapping for the current field, the next step is S3-6, otherwise the next step is S3-13.

At step S3-6, the schema name from the previous step, either the URL-specific field-to-schema mapping from step S3-4 or the generic field-to-schema mapping from step S3-5, is used The next step is step S3-7.

Before proceeding to step S3-7, step S3-13 must be described. At step S3-13, the field name is assumed to be the schema name since no URL-specific or generic field-to-schema mapping exists. This is called a dynamic schema. For example, if an unexpected field name of "shoesize" is encountered, it will be assumed to correspond to a schema name of "shoesize." If this is the first time "shoesize" is encountered, there will be no schema-to-value mapping for it, and the corresponding field will not be pre-set. But, when the user submits the form, the user's schema-to-value mapping may be updated at this step based on the submitted form as follows:
    shoesize -> 9½
Processing and operations then proceed to step S3-7.

Now that the field has been given a schema, values can be associated to the field to be filled in. At step S3-7, the value to be filled in is obtained from the schema-to-value mapping. Such a mapping is specific to a particular user. Using the above examples, a users schema-to-value mapping could be:

phone.area -> 415 address.zip -> 94109

If no value is found, the value alternatively may be obtained as a concatenation of other values. For example, the following schema names could correspond to field names at certain WWW sites:

name.first name.middle name.last

Furthermore, other WWW sites might not look for a name to be broken down, but instead look for the user's full name. The schema name for this WWW site might be:

name.all

Thus, a concatenation rule might exist for the fullname as follows:

name.all=name.first+name.middle+name.last.

The next step is step S3-8-1. If a value was obtained at step S3-7, the process continues at S3-10. Otherwise, the next step is step S3-8-2.

At step S3-8, it is determined whether a concatenation rule exists. If a concatenation rule exists, the process proceeds to step S3-9, otherwise the process proceeds to step S3-10.

At step S3-9, the values are concatenated based on the concatenation rule determined at step S3-8. The process then proceeds to step S3-10.

At step S3-10, the field is now ready to be filled in with the values from the preceding steps. The form field is filled in, either pre-filled or pre-selected, and then the process moves to step S3-11, the end of the loop.

There is a notable difference between pre-filling a value and pre-selecting a list value. When pre-filling a form field, the set of values that can be placed in the field are unconstrained, whereas the set of values for a list is constrained to be one of those defined by the form. For example, the source code in FIG. 1D has a list constrained to options 130, 132, 134, and 136 ("United States", "England", "France", and "Germany"). If the schema-to-value mapping gave any other value, the list cannot be pre-selected. The chances of being able to pre-select a value are increased if there are additional values associated with each list entry. For example, the option "England" may also have been written in HTML as:

<option value="UK">England</option>

A schema-to-value mapping referencing "UK" or "England" would facilitate pre-selecting the field. Another way to increase the chances of pre-selecting a list value is to have synonymous values in the schema-to-value mapping. For example, the values "US" or United States" could be synonyms for the value "USA".

Other problems exist with pre-setting form fields. Certain forms contain fields that ask for the user's password. Such fields are readily distinguished from non-password fields because they contain the password attribute. Several reasons make it unwise to pre-set passwords. A user may have different passwords for each WWW site. If a wrong value is used, the user won't know it's the wrong value because passwords are usually hidden when entered. And, if the form is submitted with an incorrect password, the site will receive the user's secret password for some other site. Accordingly, password fields could be skipped.

Another problem could be hidden fields. A hostile WWW site may hide pre-fillable fields to obtain user information. Since the field is hidden, the user would not notice or be otherwise aware that the hidden field was being pre-set. One way of preventing any unwanted disclosure of information is to skip hidden fields. Another solution is to provide a pop up list of all the values that would be pre-set and request the user's OK before pre-setting the form fields.

Another problem is that many WWW sites are in different languages. Although the ideas here depend on specific text strings, all strings are contained in the mappings. Therefore, the URL-specific and generic field-to-schema mappings and the value-to-schema mappings could be table driven and populated to support multiple languages.

At step S3-11, the process will loop back to step 3—3 so long as there remain form fields to be filled in. If there are no more fields, then the process will end at step S3-12.

The process steps illustrated in FIG. 3 which were described above could be modified to fill in fields on varied or more complex forms. The programming constructs necessary to bring about the operations and resultant functionality depicted in FIG. 3 will be readily understood by those skilled in the art of modern computer programming.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A system for automatically pre-setting form field values, comprising:

a network access facility configured to access a network site to receive a form including at least one field; and a mapping facility configured to map said field to a pre-determined value, said mapping facility comprising:

an application specific field-to-schema mapping facility configured to map said at least one field to an application specific schema for said at least one field when said application-specific schema is stored within said application specific field-to-schema mapping facility;

a generic field-to-schema mapping facility configured to map said at least one field to a generic schema for said at least one field when said application-specific schema is not stored within said application specific field-to-schema mapping facility and said generic schema is stored within said generic field-to-schema mapping facility; and a schema-to-value mapping facility configured to map said application-specific schema to a value when said application-specific schema is stored within said application specific field-to-schema mapping facility, and to map said generic schema to said value when said application-specific schema is not stored within said application specific field-to-schema mapping facility and said generic schema is stored within said generic field-to-schema mapping facility.

2. The system according to claim 1, wherein said network access facility is an Internet content browser client.

3. The system according to claim 1, wherein said network site is a world wide web site and said form is a hyper-text mark-up language form.

4. The system according to claim 1, wherein said network access facility is an Internet content browser client plug-in working in conjunction with an Internet content browser client.

5. The system of claim 1, wherein said application specific field-to-schema mapping facility is a uniform resource locator specific field-to-schema mapping facility, and said application specific schema is a uniform resource locator schema.

6. A method for facilitating automatic pre-setting of form field values, comprising the steps of:

accessing a network site to receive a form including at least one field;

receiving the form from said network site, said form including at least one field to be filled in; and mapping said at least one field to a pre-determined value, said step of mapping said at least one field to said predetermined value comprising the substeps of;

mapping said at least one field to an application specific schema when said application specific schema is stored within a mapping facility;

mapping said at least one field to a generic schema when said application specific schema is not stored within said mapping facility and said generic schema is stored within said mapping facility;

mapping said application specific schema to a value when said application specific schema is stored within said mapping facility; and mapping said generic schema to said value when said application specific schema is not stored within said mapping facility and said generic schema is stored within said mapping facility.

7. The method according to claim 6, wherein said network site is a world wide web site and said form is a hyper-text mark-up language form.

8. The method of claim 6, wherein said application specific schema is a uniform resource locator schema.

* * * * *